US012732556B2

(12) United States Patent
Richey et al.

(10) Patent No.: US 12,732,556 B2
(45) Date of Patent: Sep. 8, 2026

(54) PEER-TO-PEER BURST SHARING NETWORK SYSTEM

(71) Applicant: Gravity Jack, Inc., Liberty Lake, WA (US)

(72) Inventors: Aaron Luke Richey, Liberty Lake, WA (US); Jennifer Richey, Liberty Lake, WA (US); Ryan Kennedy, Spokane Valley, WA (US); Marc Rollins, Spokane, WA (US); Brandon Millsap, Spokane, WA (US); Carrie Millsap, Spokane, WA (US)

(73) Assignee: Gravity Jack, Inc., Liberty Lake, WA (US)

( * ) Notice: Subject to any disclaimer, the term of this patent is extended or adjusted under 35 U.S.C. 154(b) by 0 days.

(21) Appl. No.: 18/224,058

(22) Filed: Jul. 20, 2023

(65) Prior Publication Data

US 2025/0211637 A1 Jun. 26, 2025

Related U.S. Application Data

(60) Provisional application No. 63/390,292, filed on Jul. 19, 2022.

(51) Int. Cl.
*H04L 67/1042* (2022.01)
*H04L 67/1061* (2022.01)

(52) U.S. Cl.
CPC ...... *H04L 67/1042* (2013.01); *H04L 67/1061* (2013.01)

(58) Field of Classification Search
CPC ........................ H04L 67/1042; H04L 67/1061
See application file for complete search history.

(56) References Cited

U.S. PATENT DOCUMENTS

2018/0087906 A1* 3/2018 Kogan ............... G01C 21/1654
2023/0076490 A1* 3/2023 Bao ..................... H04W 64/003
2024/0330902 A1* 10/2024 Dashkov ............. G06Q 20/367

* cited by examiner

*Primary Examiner* — David R Lazaro
*Assistant Examiner* — Xiang Yu
(74) *Attorney, Agent, or Firm* — Neo IP

(57) ABSTRACT

The present invention is a peer-to-peer (or peer-to-server) technology that allows users or devices to purchase computing power, sensor data, and content from one another via cryptocurrency (Carbon12). Shared computing power distributed across multiple devices permits convenient devices with compact hardware as CPU requirements. The technology includes protocols and methods for transmission, exchange, valuation, advertisement of devices' computing power, sensor data, cache memory, certain algorithmic functions, and finally, settlement features for purchasing or selling the aforementioned. The network and its features allow users to display, consume, and compute augmented reality content through their devices, solving multiple AR and computer vision space issues. Payments using the cryptocurrency Carbon12 provide users with an incentive to share their dormant computing power, thereby creating a network of participating nodes, increasing the capability and accessibility of the present invention.

18 Claims, 5 Drawing Sheets

200

400

500

PEER-TO-PEER BURST SHARING NETWORK SYSTEM

BACKGROUND OF THE INVENTION

1. Field of Invention

The invention relates to peer-to-peer data, bandwidth, and computing resource sharing across nodes within a network.

2. Description of Related Art

Web2.0, the era that loosely occurred between 2005 to 2020, was characterized by advancements in web technology. These advances allowed for more complicated services, changing the internet landscape from the read-only environment of Web1.0 to a read-write environment. With these advancements, users could contribute content and connect with other web-based users on internet platforms, with computing speed being a key aspect.

Grid computing increases a single computer's ability to solve more extensive and complex problems in a shorter time. Thus, increasing a computer's workload and computing ability by distributing computing resources, e.g., central processing units (CPUs), memory, and storage, across other computers on a network. One computer accesses and utilizes the collected power of all computers on the web. Additionally, multiple computers work in tandem to complete calculations. The result is a collection of individual computers connected to a network creating a supercomputer that expedites complex and demanding computing requests. Grid computing used in a supercomputing fashion typically requires that computers on a network are, at all times, entirely dedicated to grid calculations. Negatively, computers participating in grid calculations cannot complete any other function for a user. If a computer is on the network, it is not available for standard usage or regular computations as its entire CPU is running grid calculations.

Additionally, edge computing has significantly improved data delivery latency. Yet, edge computing requires inefficient round trip processing that leads to increased processing times. While delays of 8-10 milliseconds may be acceptable for data consumption online, it is not conducive to emerging interactive web experiences like augmented reality (AR) and virtual reality (VR) platforms. And bandwidth is a consistent barrier to the efficiency of edge computing, as pathways that send and retrieve data are limited in number and quickly become congested with requests.

Moreover, determining a computer's indoor location on a network provides an obstacle because global positioning system (GPS) signals are attenuated by buildings. When signals reach buildings, the signals are scattered by roofs, walls, and other objects, hindering operability. There exist solutions for locating users indoors, however, these solutions require the installation of expensive purpose-built hardware and lack precision.

Meanwhile, displaying AR content in real-time requires significant processing power and battery life. Other issues include latency in data delivery and network congestion resulting from insufficient bandwidth. Consequently, bulky hardware that is difficult for everyday consumer use is needed. Current head-mounted displays are large, awkward, and, while sufficient for gaming purposes and immersive experiences, unrealistic to expect consumers to wear on their heads for computing in public venues. While wearable computers resemble traditional eyeglasses have been theorized, their functioning is limited as specific computation requirements are too robust for the hardware. Therefore, integrating digital content into the physical world demands comfortable devices for users yet can still effectively access the CPU of a more powerful computer or supercomputer.

SUMMARY OF THE INVENTION

The present invention overcomes these and other deficiencies of the prior art by providing increased metaverse capabilities and allowing users to reclaim their data autonomy through implementing decentralized methodologies. The present invention presents a solution for issues surrounding limited processing capabilities in small devices by creating a peer-to-peer network allowing devices to share computing power, thereby eliminating the need for more oversized hardware. It utilizes blockchain for microtransactions of cryptocurrency, preferably, Carbon12, and restores users to a position of ownership over their computation power, content, and data. In addition, the ability to share content on a peer-to-peer network with or without an internet connection reduces the risk of censorship by a centralized authority. This peer-to-peer sharing protects information and data from corruption and alteration with or without internet connectivity.

Furthermore, the present invention makes computing resources sharable and enables interaction with augmented reality ("AR") content in real-time through convenient devices acting as access points to a supercomputing network with minimal latency. Additionally, it shares sensor data, such as but not limited to CMOS, LiDAR, accelerometer, gyroscope, time-of-flight, GPS, and other similar sensor data between users in a network. Beneficially, the average consumer device has new capabilities that were previously outside of the device's computing power and bandwidth. For example, self-driving vehicles can share accelerometer, GPS, and time-of-flight data from other devices to help maneuver through traffic. Another exemplary example would be sharing CMOS data at concerts or sporting events to get camera angles that were not visible from every vantage point.

The increased computing power and battery life necessary to process augmented reality content in real-time require cumbersome hardware that is unrealistic for ubiquitous consumer use in daily life. The present invention provides a solution for the issue of limited computing capabilities within a single, particular device by creating a network that allows users to purchase dormant computing power from nearby devices via cryptocurrency. Beyond increased computing power, the novel network develops the ability to purchase other various sensor data and share content without requiring internet connectivity. Therefore, the network facilitates the production and adoption of small and convenient hardware that functions with the advanced capabilities of more computing-intensive hardware.

In an embodiment of the present invention, computation requirements are distributed across multiple nodes rather than overwhelming a particular device. It powers dynamic needs within a user's field of view, enabling interaction with digital content in the user's unique physical environment. A single computing device can process complex data in real-time, delivering almost instant results. The result is increased augmented reality capabilities for users. For instance, while users walk through a retail area, digital displays at storefronts, digital menus, product images for nearby restaurants, and available seating at a movie theater are presented. After some time, computer vision and caching memory from other devices allow devices to predict the user's field of view and provide content without requiring a user request.

In another embodiment of the present invention, a Relative Location in an Unprepared Environment protocol determines the location of each node relative to other nodes on the network. This Relative Location in an Unprepared Environment protocol ensures that computing requests are issued to nodes as geographically close to a user as possible. The process accounts for the node's motion, which prevents delays from communication with an edge device or a distant node. Individual devices no longer are burdened by complex computing requests and instead serve as an access point to a network with almost unlimited processing power. The delegation of computing resources, power, and requests allows each node to perform small calculations for each processing request, thus increasing feedback speed.

Advantageously, the present invention anticipates the adoption of lightweight head-mounted displays as a primary computing device for consumers, allowing them to interact with AR content rendered in the analog world in the same way users interact with physical objects. The present invention eliminates the need for QR codes and content consumption via smartphone—the metaverse will seamlessly integrate the digital with the physical until the two are almost indistinguishable.

The present invention eliminates delays in obtaining data by using cryptocurrency to complete microtransactions that advantageously compensate users for selling computing resources. It also provides a seamless digital experience that is not interrupted by waiting for payment verification. In addition, the present invention advances grid computing by providing a need-based network that utilizes the resources of dormant devices and devices in use by only pulling available, advertised resources from devices.

The foregoing and other features and advantages of the invention will be apparent from the following, more particular description of the invention's preferred embodiments and the accompanying drawings.

BRIEF DESCRIPTION OF THE DRAWINGS

For a complete understanding of the present invention, the objects, and advantages thereof, reference is now made to the ensuing descriptions taken in connection with the accompanying drawings briefly described as follows.

DETAILED DESCRIPTION OF PREFERRED EMBODIMENTS

Figure 1:
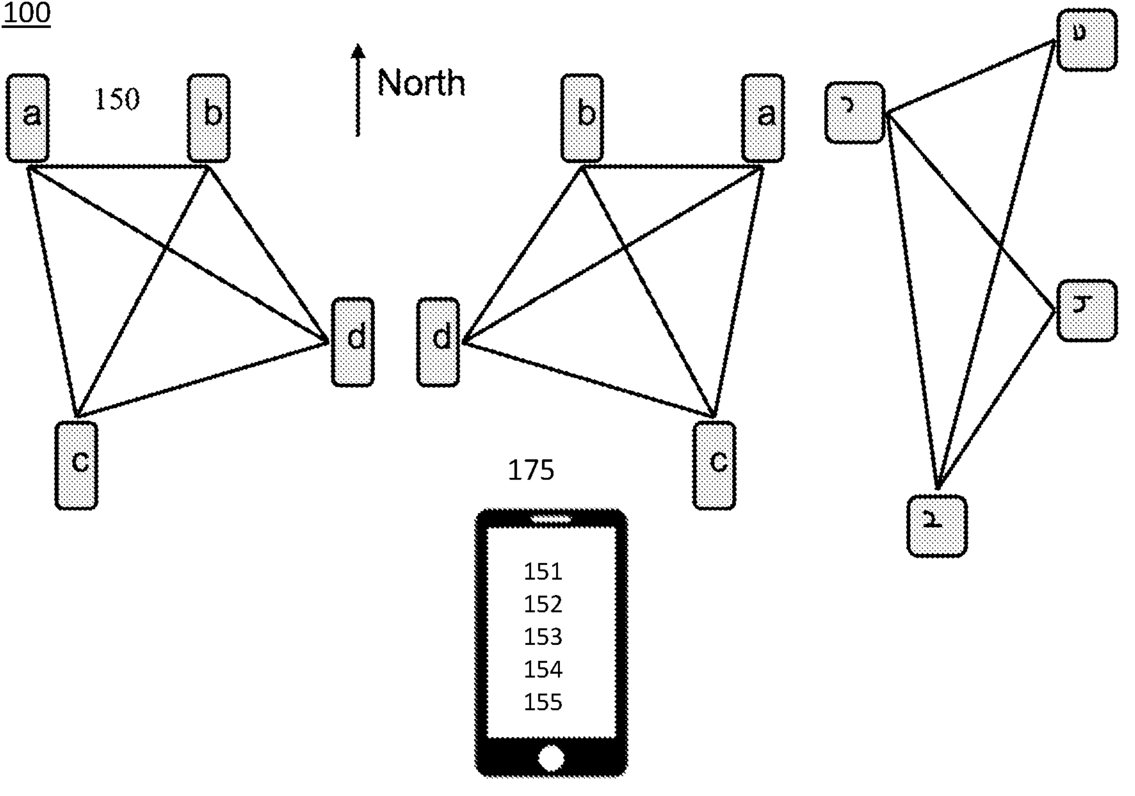
FIG. 1 illustrates a method of estimating distances between users, according to an embodiment of the invention.

Preferred embodiments of the present invention and their advantages may be understood by referring to FIGS. 1-5, wherein like reference numerals refer to like elements. The described features, structures, or characteristics of the invention may be combined in any suitable manner in one or more embodiments. It will be apparent to those skilled in the art that various modifications and variations can be made to the present invention without departing from the invention's spirit and scope. Thus, it is intended that the current invention cover modifications and variations consistent with the scope of the appended claims and their equivalents.

The computing device 175 houses a processor 151 that performs a set of operations on information as specified by computer program code 152. The computer program code 152 is a set of instructions or statements providing instructions for the operation of the processor 151 and/or the computer system to perform specified functions. The code 152 for example, may be written in a computer programming language that is compiled into a native instruction set of the processor 151. The code 152 may also be written directly using the native instruction set (e.g., machine language). The set of operations include bringing information in from the bus 153 and placing information on the bus 153. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor 151 is represented to the processor 151 by information called instructions, such as an operation code of one or more digits. A sequence of operations to be executed by the processor, 151 such as a sequence of operation codes, constitute processor instructions, also called computer system instructions or, simply, computer instructions. Processors 151 may be implemented as mechanical, electrical, magnetic, optical, chemical or quantum components, among others, alone or in combination.

The computing device 175 includes a memory 155 coupled to bus 153. The memory 155, such as a random access memory (RAM) or other dynamic storage device, stores information, including processor instructions. Dynamic memory allows information stored therein to be changed by the computing device 175. RAM allows a unit of information stored at a location called a memory address to be stored and retrieved independently of information at neighboring addresses. The memory 155 is also used by the processor 151 to store temporary values during execution of processor instructions. The computing device 175 also includes a read only memory (ROM) or other static storage device coupled to the bus 153 for storing static information, including instructions, that is not changed by the computing device 175. Some memory 155 is composed of volatile storage that loses the information stored thereon when power is lost. Also coupled to bus 153 is a non-volatile (persistent) storage device 154 for storing information, including instructions, that persists even when the computing device 175 is turned off or otherwise loses power. Information, including instructions, is provided to the bus 153 for use by the processor 151 from any external input device 156, such as a keyboard containing alphanumeric keys operated by a human user, or a sensor. In an embodiment of the present invention, there is a removeable memory 155 embodied as a thumb drive that stores data collected by the present invention.

The term network as used herein, refers to any connection method between computing devices 175 that allows for sharing resources, whether connected via the internet or not.

The present invention provides a process or protocol for determining the relative location between users in an unprepared environment. This is referred to herein as the Relative Location in an Unprepared Environment ("RLUE"). Each user's computing device serves as a Bluetooth accessory or a transmitter and server or a receiver, allowing devices to read each other's Received Signal Strength Indicator (RSSI). While Bluetooth technology is preferred, other similar technologies that will enable a device to act as an accessory/transmitter and a server/receiver can be implemented. RLUE determines the bearing of computing devices by comparing devices' location signals relative to magnetic north. Nearby devices of each user send location signals and interact with other users' devices. Additionally, because RLUE uses location signals relative to magnetic north, RLUE works with or without GPS data and does not require the pre-mapping of an environment. Thus, the protocol functions with and without existing network infrastructure, such as beacons or Wi-Fi access points. Since the environment does not need to be pre-mapped, the process can operate without an internet connection because users' devices form an ad-hoc network between them. Beneficially, RLUE works indoors where GPS is unavailable. While GPS is unnecessary, it may enhance locating other users in outdoor environments where GPS provides a good signal.

FIG. 1 illustrates a method 100 for estimating distances between computing devices 175. All computing devices 175 in communication form a constellation 150 that calculates two estimates of the distance between numerous computing devices 175. For example, a constellation 150 has at least two computing devices 175. When there are at least computing devices and two participants, the constellation 150 creates a graph of relative locations between each computing device 175 using multi-lateration 125. Multi-lateration determines 125 the relative position of nodes 115 by measuring their differential distances and factoring in the geometry of hyperboloids. The differential distance between each node 115 calculates the time of arrival from signals sent by each node 115 and subtracts the difference between the arrival times.

Consequently, rotational and mirror degeneracies frequently arise which prevent computing devices 175 from determining a location of other computing device 175. As shown in FIG. 1, using movement information from each user's computing device 175, degeneracies are broken to find the most efficient signal pathway. After degeneracies are broken, the computing devices' 175 locations can be determined and an augmented reality marker 190 is created. Since the entire room of participants' computing devices will not appear in one place and stay in place during the whole experience, FIG. 1's shape changes as users' computing devices enter a room and move. The movement vector collects the distances and bearings of users' computing devices. The movement of user c is northwest while user d is southwest, which opposition breaks the degeneracy. FIG. 1 shows that the activities between two configurations are inconsistent with any other arrangement or orientation. The changes in movement are demonstrated by the northwest movement of user "c" and the southwest movement of a user. The movements are one-of-a-kind to each user and situation. Determining the relative location of each user allows computing devices 175 to transact with nodes 115 nearest to them, thereby reducing latency and circumventing bandwidth issues. Herein, a node 115 refers to a system characterized by the collection of discrete computing devices 175 running on and sharing data and computing resources on a network and/or server. Nodes 115 arise by the geographical locations of the grouped devices and/or the number of devices or available computing resources. Accordingly, computing devices 175 herein refer to any smartphone, tablet, pad, laptop and can include televisions, monitors, computers, desktop computers, kiosks, portable electronic devices, or any other device used for computing purposes. The term fixed node 115, as used herein, refers to a node that does not move in location.

Furthermore, system 100 provides protocols beyond computing power-sharing that allow computing devices 175 to share cache memory 110. Sharing cached memory 110 provides users with requested data automatically, in real-time, and stored so that data can be presented available to users without requiring communication with edge devices or the cloud. Dynamic location determination through RLUE allows a network to predictively determine which nodes 115 will be near each other. Other caching recognizes which data is frequently requested in that area. For example, if a storefront has an augmented reality display, the fixed nodes 115 near the storefront will recognize the display as frequently requested data and cache it. Because the fixed nodes 115 never move, users walking by and requesting the display data will receive results instantaneously without communicating with an internet server. Each node 115 on the network has access to the advertised cache memory of other nearby nodes 115, making cache storage almost limitless. Like a web server, each node 115 stores compiled data generally considered geocentric data derived from computing device's created digital content. Displays, such as a storefront display, are made available and updated by the store owners and/or other users on the network. Permissions allow users to make edits and updates to a storefront. Shared caching 110 also eliminates the requirement of consistent internet connectivity because data is saved in specific nodes 115. The system 100 further reduces latency and minimizes the complexity of computing requests while ensuring data will remain available in the event of internet issues.

An example of system 100 occurs when a user interacts with an augmented reality storefront display. By walking past and interacting with a storefront display, a user sends a processing request to the network, and the network delegates different computations to each participating node 115. One node 115 pairs each other with an individual display component, and each node 115 calculates each component/member. For example, if a display presented a soccer scene, one node would calculate the soccer ball, one node would calculate the goal, one node would calculate the player playing, etc. Rather than relying on the limited pathways from the edge device to the user, the present invention further reduces latency and increases bandwidth capability by bringing the edge closer to the user and creating new pathways for data exchange between nearby individual nodes.

Additionally, a single computing device 175 and/or a node 115 can distribute its computing resources across a network, server, or system. A node 115 creates a single powerful device in crowded areas by splitting computing resources or computing power across each device at a specified rate or to another nearby node. And, a computing device 175 may use more than one node to perform heavy computing tasks nearby and available increased computing power. Meanwhile, the node's burst needs fulfillment can be programmatically determined. Burst fulfillment herein refers to sending out signals and sharing computing resources between multiple users, all sharing computing resources at one time. Accordingly, computing resources are split, but the network intuitively delegates the split while specifically not separating users or their devices.

The network perceives which nodes near the user have cached the requested data, eliminating the need for communication with the server. As this technology measures the direction a user is moving, it predictively determines which nodes will be nearest to the user at any given time, ensuring quick transaction times and computing results. Similarly, RLUE can predict which data the user may potentially request based on the cache memory of nodes the user is approaching. In one instance, if a user frequently shares certain resources in one location, the system predicts that the user will share those resources again. Users can create settings where their computing device shares resources automatically in specific areas through a module. In addition, the system 100 launches an AR interface where users can select and create the desired settings.

In an exemplary application of method 100, users identify where a person is in the room/crowd by using their AR device (phone, headset, or another similar device). Another exemplary application is a system to track fire/rescue/police personnel searching through a building. Another example may be a dating application where users filter out potential matches then matches are shown in real-time for users to find others in a room. Additionally, multi-player games can also be enabled with this methodology to see where someone else is. And the method can be a way to find other users in a large crowd inside or outside.

Figure 2:
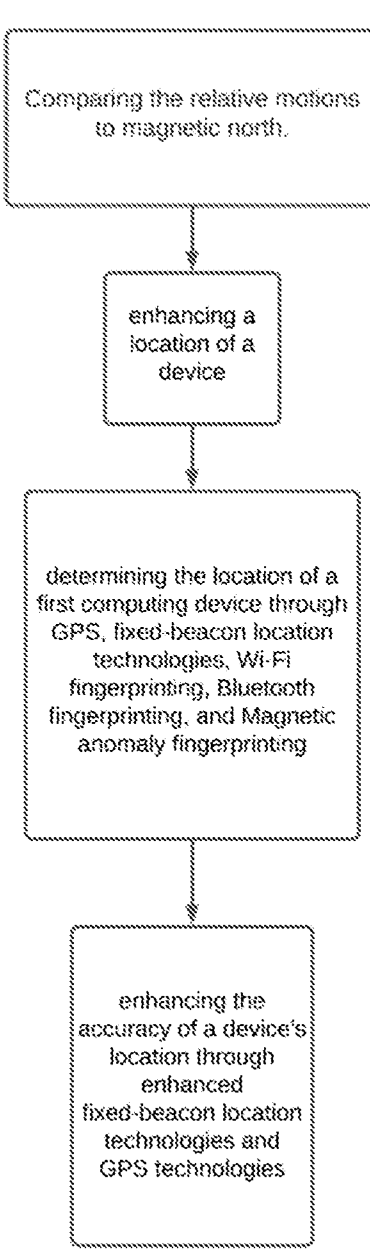
FIG. 2 illustrates a method of detecting movement between devices, according to an embodiment of the invention.

FIG. 2 illustrates a method 200 for detecting movement and orientation between computing devices. Motion is detected and measured 205 from a computing device's accelerometer 210. The accelerometer 210 generates measurements of a user when they walk. Meanwhile, the direction of movement is saved and recorded from the compass in the device. Because a measure of distance from peer-to-peer ranging is collected 215, the state of moving is more important than measuring the distance of the movement. The system understands the device's orientation by obtaining the direction of motion from the compass with tremendous precision and calculating the bearing during user activity. The device calculates its orientation via geographic coordinates while the accelerometer detects movement. However, the device does not know which direction the user is walking because the device's orientation on the user's body is not known. If the device is in a vertical orientation with the screen off, it may be in a pocket as the user walks. Thus, the device's orientation from inside the user's pocket calculates and gets recorded.

The orientation of a computing device 175 in a user's pocket is calculated by measuring the device's rotation 220 as a phone slides into the pocket after interacting with the phone. A user starts an application either from the launch icon or a message indicating that other participants are nearby. For example, an AR message or notification will pop up. The application will grab the altitude of the device. The user receives instructions to place the phone in their pocket while the network calibrates. A user gets a notification once the system is calibrated and ready. The notification is automatic and sent within an estimated one to three seconds. The new phone altitude calculates in a user's pocket by measuring the rotational difference between when in a pocket and when the device was held.

Figure 3:
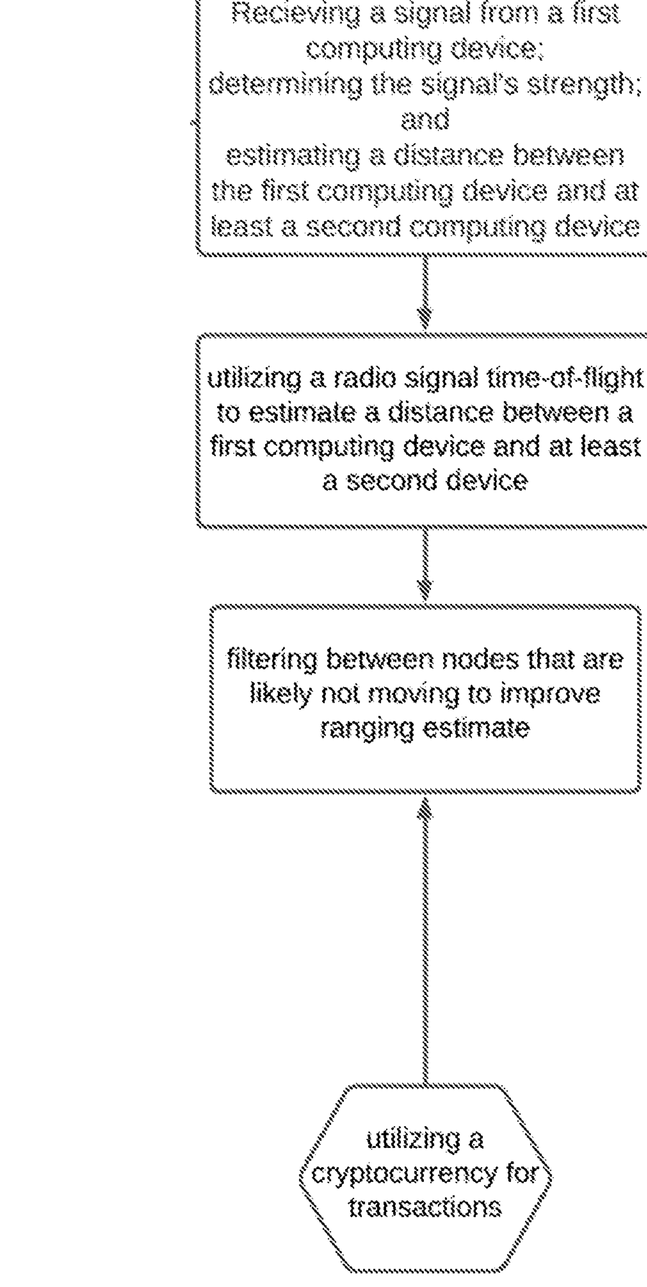
FIG. 3 illustrates a system utilizing a cryptocurrency for transactions, according to an embodiment of the invention.

As illustrated in FIG. 3, system 300 utilizes a cryptocurrency for transactions involving computing power and resource sharing, sensor data sharing, cache memory sharing, and content sharing on a network. Transactions are recorded on a blockchain to ensure the security and integrity of the network. The preferred cryptocurrency Carbon12 or $C12 allows users to transact quickly without requiring verification from an external source. The peer-to-peer nature of the present invention reflects the paradigm shift toward Web3.0, and the use of cryptocurrency and blockchain promote decentralized and democratized protocol. Additionally, cryptocurrency and blockchain technology allows users to securely exchange funds in real-time without requiring verification from an outside source, preventing waiting for payment verification to deliver a computation result. The network operates on a hyper-localized scale, utilizing processing power as close to the user as possible to reduce latency and provide feedback in real-time. System 300 creates an entire network and uses multiple chains, one for commerce and transactions and one for data retrieval. The latter uses an Arweave 350 backend to maintain user content, data integrity, and security.

The Arweave 350 is a blockchain-type backend to retrieve cached data rather than URLs. Arweave 350 provides peer-to-peer media protocol technology and financially incentivized nodes across a network 305 to share computing devices' unused storage space and store user files. Network 305 encourages creating and storing duplicates of files across multiple nodes for users to access files quickly regardless of internet connectivity. Each file has a unique "digital fingerprint," protecting it from being tampered with or altered. The Arweave 350 is powered by a blockweave 355. Just as a blockchain is a linked collection of blocks containing transactions, a blockweave 355 is specifically designed for the Arweave 350 protocol. The blockweave 355 is a set of data blocks and links to multiple previous blocks from the network. This data structure allows the network to enforce that miners (for cryptocurrency) must provide a Proof of Access (PoA) to old data to add new blocks. Unlike in a traditional blockchain, where miners must expend electricity to earn tokens, in the Arweave 350 network, miners are encouraged to replicate valuable data. This valuable data can include the information stored in the network to gain tokens. This mechanism offsets the value usually wasted in blockchain networks with practical and energy-efficient data storage. Arweave 350 allows for secure file storage and expedient data retrieval with or without internet connectivity. It also protects user data from exploitation by companies or alteration by bad actors and centralized authority while ensuring a convenient and efficient experience for the users themselves.

Furthermore, specific modules of the present invention may, alone or with resources of an associated backend, monitor computing resource control signaling and sharing between a communicatively coupled node and a control module. Herein, modules can be embodied as software and a computer program product or an application on a computing device, downloaded from the internet, or purchased. Monitoring beneficially detects when a specific node with user computing devices communicating with each other and sharing computing resources is about to hand over to another node. If the node is being handed over to a node with a different zone or geography, a module of the first node creates a zone or range, alone or with the support of application services. The module may determine which new zone the node is about to hand over. Optionally, a module of the first zone may contact a module in a new zone and may coordinate the transfer of active computing resource sharing.

Along with the state information, a module may transfer one or more user designations to enable a server application running on a node in the new zone to connect with the moving node's user requests. Where the leaving node's computing resource sharing is in the current zone, the transfer of state data, computing resources, and user identifier information enable a node in the new zone to connect with a user's device. It picks up the active user session where the server application in the previous zone left off. More generally, user session and computing resource sharing on a node moving between zones may be maintained by transferring computing resource data, such as session state data, from a first node in the first zone to a second node in the second zone.

A node 115, according to embodiments, may include computing resources such as operating memory, digital processing circuits, and data connectivity circuits for running one or more applications and sharing computing resources. Also, it may be adapted to allocate at least a portion of the node's computing resources to other users' computing devices and share computing resources. A node within a network, according to embodiments, may connect to and with other nodes in the same zone, to and with nodes in other zones, and with internet resources. User computing resource sharing to a specific node may be restricted to user applications and by user preferences and settings. Moreover, zone-specific DNSs associated with specific zones cause connection requests from a zone to a connected node in the same zone. In another instance, the connection requests come from a zone to a corresponding node in a different zone.

A user sharing computing resources via a computing device on a node may switch from a first zone to a second zone. The switching is maintained by transferring a corresponding computing resource sharing session of a first zone to a node of a second zone. The complementary computing resource sharing session is transferred by copying the user's computing device's shared resource data from the sharing session on the first zone and creating another sharing session with the copied session state data on a node of the second zone. These sharing session transfers may be achieved through steps performed by modules running on nodes within the first and second zones.

A node 115 may include a module to manage the computing resource sharing system. In addition, the module may control switching between two or more nodes and zones. The node may route computing resources from one computing device to another computing device, shift computing resources from one computing device to another computing device, and a combination thereof.

The node 115 may be decentralized and may connect with and to modules running on portions of each of multiple nodes spread across different zones. For example, at least one module is located in each zone which users in a zone group. The modules from each zone may communicate with at least one other module located in another zone. The communication may be in the form of TCP/IP packet transmission to a specific module or a zone group.

In addition, system 300 automates payment or settlement in the background while computing requests are calculated. The user can pre-configure settings in the system, for example, a maximum cost per kiloflop for purchasing or a minimum price for the resources when there is one provider or the same provider. In addition, the system extends to other selling and purchasing points like bandwidth and sensors. The system and payment also can be controlled to turn on and turn off at specified or scheduled times or on-demand. Provided that once a device becomes a node that consumes or sells, the user does not need to adjust settings. Thus, users receive instantaneous feedback even if the transaction is still occurring. Payment must occur for users to remain on the network—if a bad actor attempts to steal computing resources without compensation, they will be excluded from the network permanently.

Meanwhile, system 300 takes a small fee from every transaction used to pay node-only devices and covers losses from sellers who sold resources to a bad actor without being compensated. Additionally, system 300 features a security module. The security module protects users in case of bad actors on the network to prevent a loss of computing resources. The security module first determines if there is suspicious activity and flags a user or device as a "bad actor" that may be attempting to steal resources. Flagged profiles or devices are sent to a flagged profile or bad actor node list for each geography or location area. It then supplements fees from transactions from a cryptocurrency treasury that is stored in the system 300 to compensate if there is a theft. The security module repeats this process in a constantly occurring cycle to keep the minimum resources lost to micro-amounts that are not noticeable. Once the flagged profile node reaches a limit or predetermined threshold of users, devise, flagged profiles, or computing resource thefts, the entire node is dropped. This security module process that includes node dropping occurs within seconds; by the subsequent request, the flagged profile is not included, and/or that node is also not included. Thus, the security module protects users by only using a micro-amount of computing resources in case of a bad actor. Users view with the opportunity to reclaim autonomy over their data. They finally see the profit from sharing their data and determine which data is advertised to the network. Since system 300 is peer-to-peer, users will pay one another to utilize shared data and computing power, creating an ecosystem that circulates funds among users rather than funneling profit to corporations. For example, a user designates the type of computing resource the device sends and receives. Specifically, both a seller and a purchaser can determine the kind of computing resources and quality of service (QoS) parameters. Thus a user's device is not used while performing actions on it.

A user who needs computing power sends a request to the network, which will find users with available CPU for the desired price and automatically create a payment or settlement between the involved parties. The settlement can process in the background while the network delivers feedback instantaneously, circumventing delays from waiting for payment verification.

Figure 4:
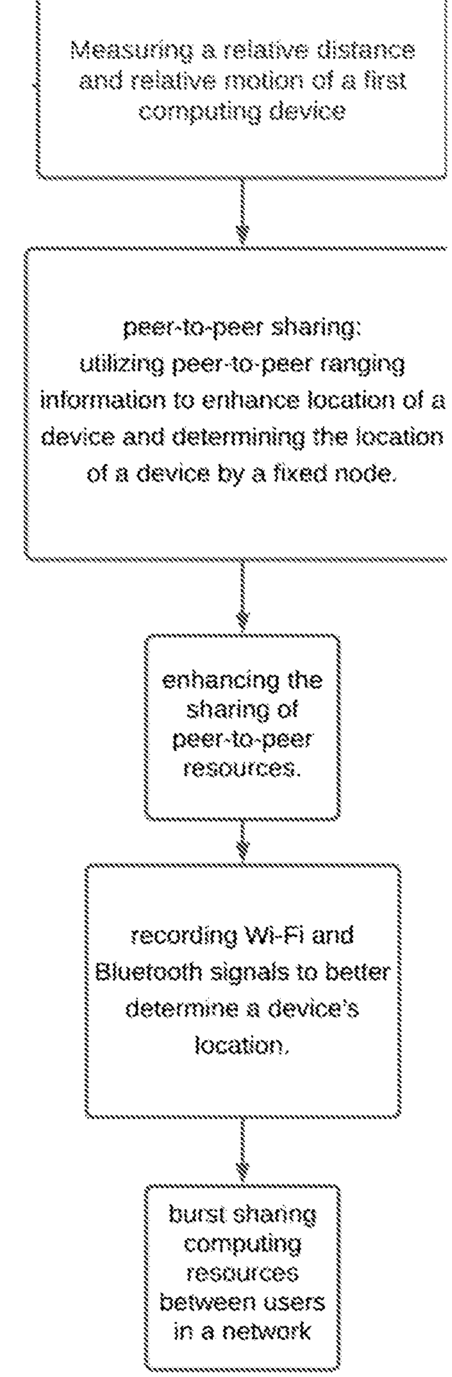
FIG. 4 illustrates a novel form of grid computing, according to an embodiment of the invention.

FIG. 4 illustrates a novel form of a grid computing system 400, referred to herein as Burst Sharing. Burst Sharing provides access to a grid network on a need basis, rather than requiring that nodes remain on the grid at all times. Users needing extra computing power may submit a request to the network, and Burst Sharing will automatically distribute the computing requirements across available nodes. Specifically, additional power is needed to run AR applications. In addition, it prioritizes which nodes are utilized based on available CPU, distance from the requesting user, and price point of the required resources. While grid computing requires a node to be running and online at all times, Burst Sharing can pull resources from dormant devices, enabling the user to profit off of computing power while their device is not in use. For selling resources, the stack must be in resident in memory for users to opt-in and opt-out for users to automatically opt in or opt-out. For example, users can opt-out automatically during certain conditions like using a computing device.

Additionally, Burst Sharing allows users to use their devices as they typically would and still participate in the grid, rather than demanding the entire CPU to process all devices. Advertisement packets allow nodes to display only what computing resources are currently available. Users can scroll through social media, send emails and messages, stream videos or movies, and still provide their remaining CPU to the grid. Users can participate in system 400 and make money while they scroll on applications, send an email, or even while their device sits unused in their pocket. Again, these need-based Grid calculations are referred to as burst sharing in that it is not a network constantly devoted to a few calculations or one complex calculation. However, it pulls bursts of computing resources from devices to perform computations upon request.

Two or more nodes 115 with or without a mobile network may be located within, or be otherwise associated with, an edge or cloud computing module. It may also be integral or otherwise functionally associated with at least one edge or cloud computing node part of a first zone. A network may include multiple zones associated with numerous nodes creating access points. Access points may be user computing device nodes, Wi-Fi hotspots, or other computing devices. A node may be or may include computing resources or a platform including one or more processors, memory, and an operating system running a single server at a time. Alternatively, the platform may include an operating system adapted to host multiple virtual servers (e.g., virtual machines). According to further embodiments, a node may include various platforms operating together and sharing computing resources—thereby creating a grid computer. A node, either running a single server operating system or running a virtual machine (e.g., VMWare) with multiple virtual machines (e.g., virtual servers) running on, creates a platform for computing resource sharing between users. A server operating system or a virtual machine/server is running on a node of a specific zone that functions similar to a physical server.

In addition, the grid computing system 400 brings the edge as close as possible to the user by distributing computing requests across multiple nodes. Users access a supercomputer at all times, providing the ability to interact with augmented reality content in real-time without being obstructed by cumbersome hardware, limited battery life, computing power, or feedback latency. Therefore, a network that functions as a supercomputer directly next to the user is created. The term supercomputer used herein refers to an increased computing power extending beyond standard computing power exemplified in current smartphones and tablets. System 400 further reduces latency and increases bandwidth capability by bringing the edge closer to the user by creating new pathways for data exchange between nearby individual nodes. The novel system beneficially does not rely on the limited pathways from the edge device to the user. This functionality also allows the system 400 and network to operate without internet connectivity.

Advantageously, system 400 works in enclosed spaces that may not have access to GPS signals. Additionally, system 400 does not need to have any other equipment installed for prior use of localization nor have any devices installed that have a known location. Because existing examples use older Wi-Fi infrastructure, magnetic field anomalies to fingerprint the radio, or magnetic characteristics at each point in the indoor space. These examples require a training procedure for each environment and therefore do not scale. System 400 works in an ad hoc environment with no preparation or calibration. The system 400 can work without an internet connection as long as the users' devices can form an ad-hoc network between them—for example, via Wi-Fi direct, Ultra-Wideband, or Bluetooth Low Energy signaling. In addition, RLUE uses movement information from each user to determine location and distance relative to all nodes on the network, measuring changes in the graph as users enter and move about an environment. Movement is detected and calculated from accelerometer data, while the direction is obtained from the compass in the device.

Figure 5:
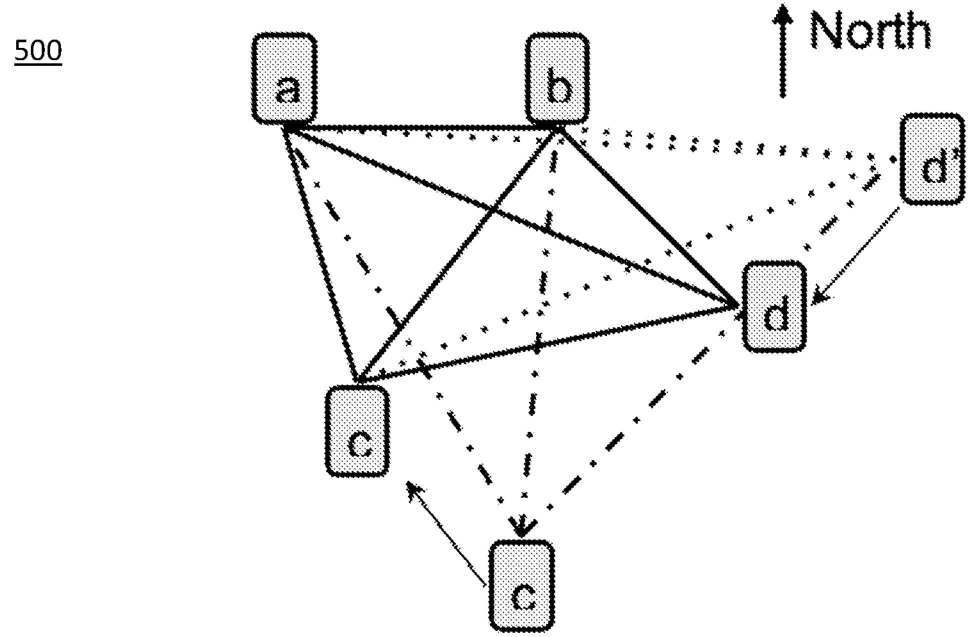
FIG. 5 illustrates an advertisement node system, according to an embodiment of the invention.

As illustrated in FIG. 5, each node 500 displays an advertisement packet to the network. The advertisement packet details what features are available for peer usage. The packets include how many dynamic teraflops or micro-teraflops are available for computing power at the time of advertisement, the distance from nodes it is advertising to, whether or not each node is stationary or in motion, and which sensors the node is willing to share. A transaction for a computing task includes several discrete transactions in that settlement is occurring while the complete computing task might still be running in the background. There is no financial settlement if a user loses connection to other nodes that did not complete a job. Another node is then found, or if no nodes are found, a user finalizes the task on the computing device. In addition, the node can provide other features that are similar in function. Advertised computing power units will range depending on how much power is available at any given time—dormant devices will advertise more available micro-teraflops than a device in use. Time of flight packets and RLUE are combined to calculate the advertised distance. Sensor advertisements include accelerometer, gyroscope, CMOS (Camera), and LiDar data.

Additionally, users can opt to advertise their device to the network as a node only, allowing users to participate in the network and see profit without sharing sensor data or computing power. These devices will solely be utilized to transfer traffic within the network to reduce congestion or bridge distance between transacting nodes. As such, the utilization of advertisement packets creates a need-based network that selects nodes based on user requirements and location. The system 500 determines which nodes best fulfill each request, ensuring that users receive the quickest feedback for the lowest price. As a result, system 500 successfully creates a grid network that intuits the needs of the user and judges which nodes can efficiently satisfy those needs without pulling unnecessary resources from every member of the network.

Additionally, requesters can pull from multiple sources if one source does not have enough resources for that member. By using numerous nodes at once, a user gains the collective power of all of them together as concurrent speed increases. Even if a single computing device has the computing power and resources to perform a task, and there are other reliable nodes available that are determined in their reliability rating, all nodes will be used. Therefore, efficiency, speed, and computing resources are all increased.

Simulations and results expect localization errors will reduce as more people participate in the network. Given the number of degrees of freedom, it is more effective to characterize the accuracy and precision of the system in a simulation rather than producing a fully analytical model. Accurate results show that when the sensor data is of good quality. Such sensor data includes measuring distances with Bluetooth, compass headings, and estimating walking distances with the accelerometer. Specifically, IEEE 802.15.4a provides a standard with a time-of-flight measurement in ultra-wideband radios.

While the invention has been described in connection with a number of embodiments and implementations, the invention is not so limited but covers various apparent modifications and equivalent arrangements, which fall within the purview of the appended claims. Although features of the invention are expressed in certain combinations among the claims, it is contemplated that these features can be arranged in any combination and order. The invention has been described herein using specific embodiments for illustrative purposes only. It will be readily apparent to one of ordinary skill in the art, however, that the principles of the invention can be embodied in other ways. Therefore, the invention should not be regarded as limited in scope to the specific embodiments disclosed herein; it should be fully commensurate in scope with the following claims.

We claim:

1. A method for determining the direction and distance from one computing device to another computing device, the method comprising the steps of:

presenting an Augmented Reality (AR) interface;

receiving a signal from a first computing device at a second computing device;

measuring a differential distance of the first computing device relative to the second computing device using a time of arrival measurement of the signal or a received signal strength indicator (RSSI) of the signal;

measuring, via an accelerometer included in the first computing device, motion of the first computing device by detecting movement of the first computing device;

determining a direction of the motion of the first computing device relative to magnetic north and an orientation of the first computing device relative to magnetic north;

determining a position of the first computing device relative to the second computing device based on the direction of the motion of the first computing device relative to magnetic north, the orientation of the first computing device relative to magnetic north, and the differential distance of the first computing device relative to the second computing device;

creating a node comprising the first computing device, the second computing device, and a plurality of other computing devices; and predicting a future proximity of the node to at least one second node based on the direction of the motion of the first computing device relative to magnetic north;

wherein the at least one second node comprises a second plurality of other computing devices;

accessing via the AR interface at least one localized cache of information stored by one or more computing device of the second plurality of other computing devices of the at least one second node.

2. The method of claim 1, further comprising the step of forming a constellation comprising a plurality of nodes.

3. The method of claim 1, further comprising the step of filtering the signal.

4. The method of claim 3, wherein the step of filtering the signal comprises filtering a Bluetooth signal.

5. The method of claim 1, wherein the at least one localized cache of information stored by the one or more computing device of the second plurality of other computing devices of the at least one second node includes at least one previously requested piece of data.

6. A method for enhancing a location of a computing device comprising the steps of:

presenting an Augmented Reality (AR) interface;

launching a computer program via installed computer code;

receiving, via the computer program, a signal from a first computing device at a second computing device;

measuring, via the computer program, a differential distance of the first computing device relative to the second computing device using a received signal strength indicator (RSSI) of the signal;

measuring, via the computer program, motion of the first computing device by detecting movement via an accelerometer;

determining, via the computer program, a direction of the motion of the first computing device relative to magnetic north and an orientation of the first computing device relative to magnetic north;

determining, via the computer program, a position of the first computing device relative to the second computing device based on the direction of the motion of the first computing device relative to magnetic north, the orientation of the first computing device relative to magnetic north, and the differential distance of the first computing device relative to the second computing device; and predicting, via the computer program, a future proximity of the first computing device to at least one node based on the direction of the motion of the first computing device relative to magnetic north;

wherein the at least one node comprises a plurality of other computing devices;

accessing, via the AR interface, at least one localized cache of information stored by one or more computing device of the plurality of other computing devices of the at least one node.

7. The method of claim 6, further comprising the step of utilizing multi-lateration to determine a position of an additional node relative to the first computing device and the second computing device.

8. The method of claim 7, wherein the step of utilizing multi-lateration to determine a relative position of the additional node comprises the steps of:

measuring a first node's distance from the first computing device;

measuring a second node's distance from the first computing device;

determining a differential distance between the first node's distance and the second node's distance;

factoring in a geometry of a hyperboloid;

calculating the time of arrival from a signal sent from the first node to the second node; and determining a difference between arrival times.

9. A method for peer-to-peer data sharing comprising the steps of:

receiving, via at least one fixed node, a signal from a computing device;

measuring a differential distance of the computing device relative to the at least one fixed node using a time of arrival measurement of the signal;

measuring, via an accelerometer included in the computing device, motion of the computing device by detecting movement of the computing device;

determining a direction of the motion of the computing device relative to magnetic north and an orientation of the computing device relative to magnetic north;

determining a position of the computing device relative to the at least one fixed node based on the direction of the motion of the computing device relative to magnetic north, the orientation of the computing device relative to magnetic north, and the differential distance of the computing device relative to the at least one fixed node;

predicting a future proximity of the computing device to at least one second node based on the direction of the motion of the computing device relative to magnetic north; and determining, via the predicted future proximity, if the at least one second node will be closer to the computing device than the at least one fixed node;

wherein the at least one fixed node has a fixed position and comprises a plurality of other computing devices; and wherein the at least one second node comprises a second plurality of other computing devices;

accessing at least one localized cache of information stored by one or more computing device of the second plurality of other computing devices of the at least one second node;

and placing an augmented reality marker in a physical location via computer program code installed on the computing device.

10. The method of claim 9, further comprising the step of recording a signal from the computing device.

11. The method of claim 10, wherein the step of recording a signal comprises recording Wi-Fi and Bluetooth signals.

12. The method of claim 11, further comprising collecting the Wi-Fi and Bluetooth signals to determine a location of the computing device.

13. The method of claim 9, further comprising the step of recording a signal from a second computing device.

14. The method of claim 9, further comprising the step of burst sharing computing resources between the computing device and a second computing device.

15. The method of claim 9, further comprising the step of accessing cache memory between the computing device, the at least one fixed node, and the at least one second node.

16. The method of claim 9, further comprising the step of sharing cache memory between the computing device, the at least one fixed node, and the at least one second node.

17. The method of claim 9, further comprising the step of presenting an AR storefront via a graphical user interface.

18. The method of claim 9, further comprising the step of utilizing a cryptocurrency for a transaction involving sharing data and computing resources.

* * * * *